United States Patent [19]
Kershaw

[11] 3,808,876
[45] May 7, 1974

[54] AIR PERMEABILITY TESTER

[76] Inventor: Thomas N. Kershaw, Aunt Park Lane, Newtown, Conn. 06470

[22] Filed: Oct. 2, 1972

[21] Appl. No.: 294,199

[52] U.S. Cl. .................................................. 73/38
[51] Int. Cl. ............................................. G01m 3/26
[58] Field of Search ......................................... 73/38

[56] References Cited
UNITED STATES PATENTS
3,138,014  6/1964  Jorre ..................................... 73/38
3,056,281  10/1962  Smyth .................................... 73/38

*Primary Examiner*—Donald O. Woodiel
*Attorney, Agent, or Firm*—Kane, Dalsimer, Kane, Sullivan & Kurucz

[57] ABSTRACT

A portable air permeability testing device to directly register the permeability of a surface. The device includes a hollow probe with a passageway therethrough and one open end of the probe adapted to be placed proximal to a surface to be tested. A flow meter is connected to and is in fluid communication with the other open end of the probe. A static pressure probe is in communication with the interior of the hollow probe and is connected to a pressure gauge to measure the static pressure at a predetermined point in the interior of the hollow probe. Air flow control means are utilized to pass air through the surface to be tested, the hollow probe and the flow meter a predetermined rate to provide a desired static pressure within the hollow probe. In this manner, indicator means on the flow meter directly registers the permeability of the surface.

12 Claims, 5 Drawing Figures

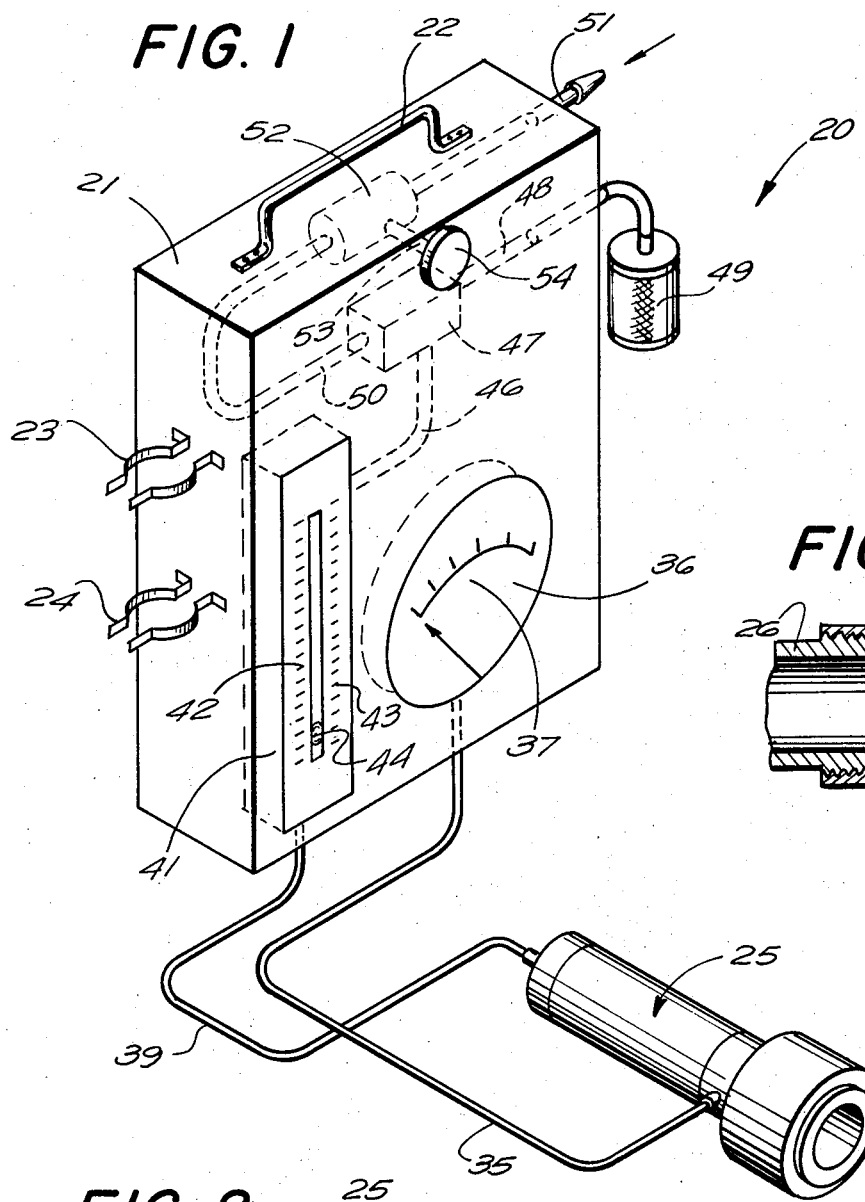

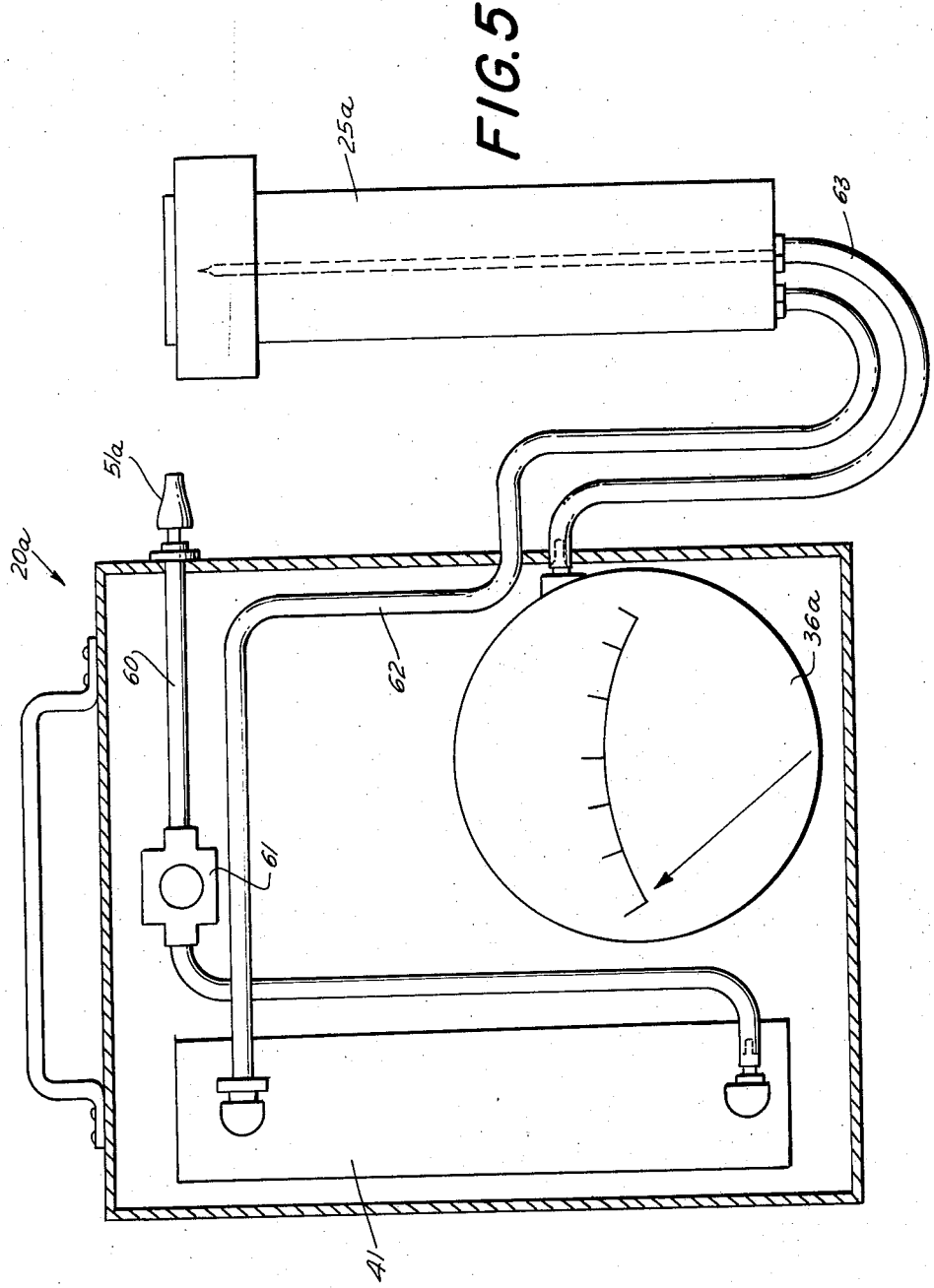

AIR PERMEABILITY TESTER

BACKGROUND OF THE INVENTION

In many instances and in many environments it is often desirable to test the permeability of a surface during manufacture and other industrial procedures. Exact testing procedures can be accomplished in the laboratory, however, day-to-day on-site testing is often difficult. This is particularly true where it is most advantageous to be able to test permeability on site with direct readings which are comparable to readings which could be obtained in the laboratory. In complicated mechanized systems it is usually quite difficult to disassemble the systems to bring the surface to be tested into the laboratory. Additionally, transportation from the location of use to the laboratory often will provide different conditions which would affect the test results.

Solutions for on-site testing have been suggested in the prior art, however, the known devices are not capable of directly measuring permeability.

For example, the device disclosed in the Smyth U.S. Pat. No. 3,056,281 has certain shortcomings. The most dominant problem deals with the fact that the Smyth device only measures pressure. It does not directly measure flow and cannot be used for direct permeability measurement.

Another shortcoming of many prior art devices is that they are limited to the testing of felts. It would be greatly advantageous and useful if a multiple use permeability testing device could be provided which permits field measurements of air permeability of forming fabrics and wires including rigid open weave items on which they are not applicable. Furthermore, the prior art does not provide for a device useful in the field and manufacturing location to provide air permeability data on drier fabrics and press felts.

No known instrument in the field is available for making one-sided tests directly for air permeability. Naturally, it should be kept in mind that the versatility of a device should permit it to be used in both a one-sided testing manner and adaptable for use in two-sided testing procedures. This applies both to tensional and non-tensional fabric samples.

During the past several years, the paper industry has relied heavily on the use of the Smyth porosity tester for evaluating the on-machine rate of decrease of wet felt permeability. The Smyth device is useful only on the wet press section, and only because it gives relative values of permeability in terms of percent closed. An absolute value of permeability in engineering units is a much more useful measure of fabric condition. The result gives values which are much more sensitive to changes in felt condition. Since the introduction of open-mesh drier fabrics, and more recently, the controlled permeability fabrics, the need has existed for an instrument which could be used to measure air-permeability profiles in the cross-machine direction in the drier section. The acute need in the field is readily perceptible.

SUMMARY OF THE INVENTION

With the above background in mind, it is among the primary objectives of the present invention to provide an air permeability device which is lightweight and easy to use and is capable of making one sided air permeability measurements on location in field situations which can be directly compared to laboratory measurements made on established air permeability testers. A device is provided which is highly portable and is compact, is capable of direct permeability readings and is versatile in ranges and accuracies. The device is capable of test which can be performed on location in both static and dynamic situations yielding results directly relateable to laboratory numbers.

The portable device directly measures the air permeability of materials by drawing a controlled flow of air and measuring the pressure drop developed when the item under investigation is placed in front of the air inlet. This is accomplished by the portable nature of the testing device for a one-sided test to provide information concerning flow rate and pressure drop with the device being compacted in a portable nature. Furthermore, it is an objective to provide a device which is adaptable for use in a vacuum environment by drawing air through the surface undergoing testing into the device and also adaptable for use in blowing air through the device and then through the surface to be tested. The system is designed for basically one-sided testing apparatus, however, it is adaptable for use in a system which employs a two-sided handling of the surface under investigation by means of a simple attachment. In further regard to versatility, various sophisticated forms are envisioned whereby water separation means are provided between the air flow path and the flow meter to insure accurate readings and where electrical operation is utilized in supplement to the air operation or independent of the air operation of the system as described herein.

In summary, a portable air permeability testing device is provided for directly recording the permeability of a surface. The device includes a hollow probe with a passageway therethrough and one end of the probe adapted to be placed proximal to a surface to be tested for permeability. A flow meter is connected to and is in fluid communication with the other open end of the probe. A static pressure probe connected to a pressure gauge is in communication with the interior of the hollow probe to facilitate measurement of the static pressure at a predetermined point in the interior of the hollow probe. Air flow control means is provided to pass air through the surface to be tested, the hollow probe and the flow meter at a predetermined rate to provide a desired static pressure within the hollow probe. In this manner, indicator means on the flow meter will directly register the permeability of the surface.

In general, the basic features of the present structure include a small remote airtight chamber, one end capable of accepting a wide variety of end configurations, and two exit ports and small light tubing leading to a measuring unit. Both pressure drop across the material being tested and the flow rate through the material are indicated by the measuring unit thus allowing complete determination of the air permeability. The capability of interchangeability of end configurations allows optimal seal, and thereby best accuracy for the wide range of materials and forms of material on which air permeability measurements are desired.

The units are constructed to work with air being directed through the material into the testing device and can be made to function in the reverse situation where air is directed through the testing device and then through the material.

Furthermore, a pressure sensor is employed in the remote airtight chamber which permits the use of small tubing and thereby provides for compactness of the total system. The remote airtight chamber or probe embodying the pressure sensor is of value in insuring the accuracy of the permeability measuring facilities of the instrument. The device of the invention requires no calibration by the user. It simultaneously measures flow and pressure. It supplies air permeability information comparable to the accepted standard laboratory air permeability tester known in the art. It is not limited to the testing of felts nor is it limited to one-side testing of fabrics. The device has application in field survey work and in quality control work in mill production and laboratory tests. The primary advantages include direct permeability reading at a selected preset pressure drop, portability, ability to make measurements by contacting only one side of the fabric, and low cost.

With the above objectives in mind, among others, reference is had to the attached drawings.

BRIEF DESCRIPTION OF THE DRAWINGS

In the drawings:

FIG. 1 is a perspective view of the device of the invention;

FIG. 2 is a sectional view of the probe portion of the device of the invention;

FIG. 3 is a fragmentary sectional view of an alternate embodiment of the probe portion of the device of the invention;

FIG. 4 is a graphic representation of the accuracy of the device in comparison to a known laboratory device and FIG. 5 is a sectional side elevation view of an alternative device of the invention.

DESCRIPTION OF THE PREFERRED EMBODIMENT

Figure 4:
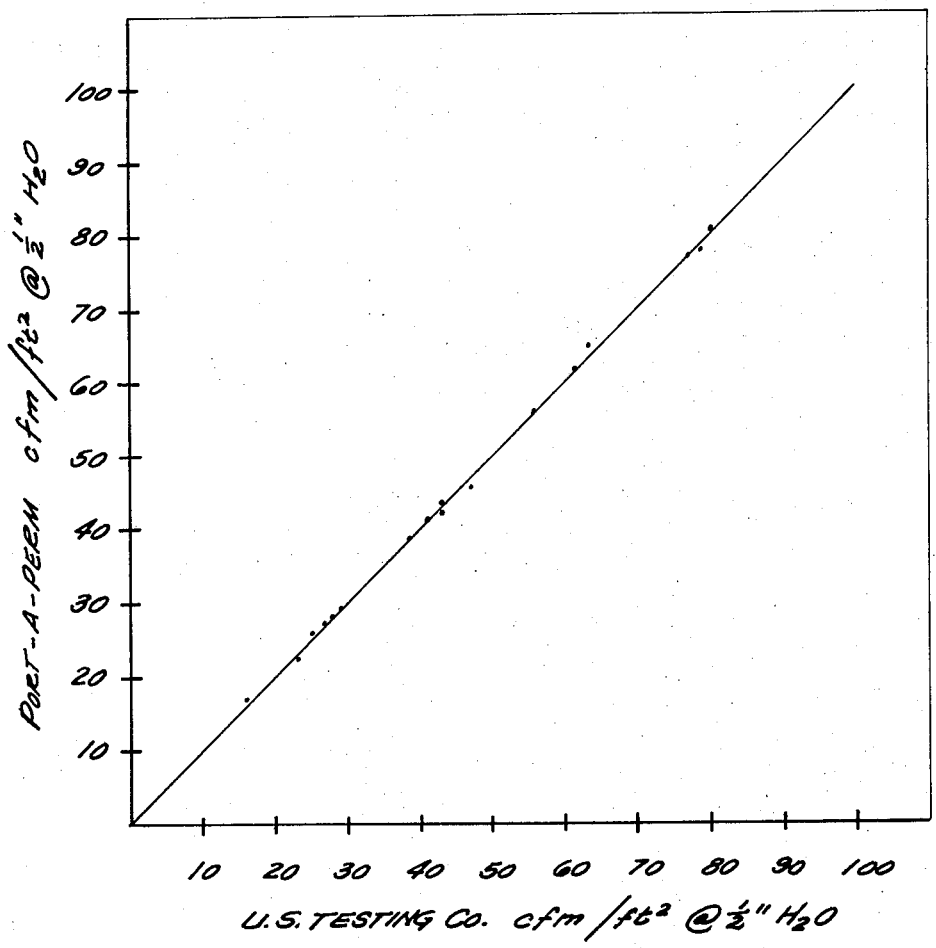

The testing device 20 is shown in one portable form in its entirety in FIG. 1. The majority of the device 20 is housed in a hollow cabinet 21 which contains a handle on its upper surface 22 to facilitate its portability. The cabinet is constructed of a lightweight material which also facilitates the mobility of the device. During non-use and transportation of the device, a pair of resilient clips 23 and 24 are mounted on the side wall of cabinet 21 to hold probe 25 in fixed position. During use, as shown in FIG. 1, the probe 25 is displaced from clips 23 and 24 and positioned proximal to the surface to be tested.

Probe 25 is comprised primarily of a central tubular body portion 26 having a hollow interior chamber 27. The forward end of tubular body 26 has a threaded outer surface 28 to accommodate the threaded inner surface 29 of a removable end cap 30. An opening 31 is at the distal end of end cap 30 and communicates with the interior chamber 27 of body 26. The interengagement between threaded surface 28 and threaded surface 29 provides a sealing interengagement between end cap 30 and body 26 to prevent leakage and permit complete passage of air through opening 31 into body 27.

Intermediate the ends of body 26 and located in chamber 27 is a static head or probe 32. Probe 32 is connected by means of a sealing fitting 33 through an opening 34 in the side wall of body 26 to a tube 35. The other end of tube 35, as shown in FIG. 1, is connected to a static pressure gauge 36 housed in cabinet 21. The face of pressure gauge 36 is exposed to the exterior of cabinet 21 and has indicator means 37 thereon to indicate the static pressure within probe 25 at any given time.

At the terminal end of body 26 is an end wall opening 38 to which is connected one end of a tube 39 by means of a sealed fitting 40. The other end of tube 39 is connected to the lower end of a flow meter 41 housed in cabinet 21. The only exit from body 26 is through tube 39 and as indicated above, the remainder of probe 25 is sealed so that air flow through open end 31 is through tube 39 thereby facilitating the accuracy of the measuring device.

Flow meter 41 has a reading face exposed to the exterior of cabinet 21. On the exposed exterior face of flow meter 41 are a pair of parallel scales 42 and 43. Also exposed to the exterior of cabinet 21 is the movable indicator, for example as shown, a floater ball 44 which is movable upward in flow meter 41 in response to air pressure from below in order to indicate the direct flow pressure reading. The number of scales on flow meter 41 are a matter of choice and depend upon the number of different types of removable end caps 30 which are employed with probe 25. For example, as shown in FIG. 3, an end cap 30' may be employed with a small end opening 45. Since end opening 45 is considerably smaller than end opening 31, the flow rate would be considerably different through probe 25 and therefore a different scale would presumably be utilized on flow meter 41 in order to get the direct permeability reading. In this manner, the versatility of the device is demonstrated and for any number of end caps, any number of scales may be provided on flow meter 41 with the ball indicator 44 being displaceable to give a direct reading.

Extending from the upper end of flow meter 41 and in fluid communication with the interior thereof and the attached end of tube 39 is an exit tube 46. The opposite end of exit tube 46 is attached to a vacuum box 47 which has a hollow interior in fluid communication with the open end of tube 46. As shown, tube 46 extends through the bottom wall of vacuum box 47 and the box has openings in opposing side walls for fluid communication with an inlet and an outlet tube. The outlet tube 48 extends through an opening in the side wall of cabinet 21 and terminates in a muffler 49 for exhaust purposes. Muffler 49 facilitates quiet operation of the device 20. The inlet tube 50 is substantially housed within cabinet 21 and extends through another opening in cabinet 21 to form an external connector portion 51 for attachment to a source of compressed air. A typical adapter may be placed on the end 51 of tube 50 to facilitate its connection to any convenient source of compressed air. An arrow shows the direction of flow of air into the device upon connection. Passage of compressed air in the direction shown through tube 50 will cause a vacuum in the system and will draw air through opening 31 as indicated by the arrow adjacent to probe 25. Intermediate the ends of tube 50 is a valve 52 which includes a rotatable valve stem 53 terminating in a knob 54 exteriorly of cabinet 21. Stem 53 extends through a convenient opening in cabinet 21. Rotation of knob 54 causes stem 53 to rotate accordingly and valve 52 to be opened and closed as desired in a conventional manner. It should be noted that the knob 54 is adjacent to handle 22 so that the operator need only use one finger such as thumb to open and close the valve while maintaining his grip on the portable unit by means of handle 22.

In operation, device 20 is carried to the on-site location with probe 25 being mounted in clips 23 and 24 to provide the portable compact lightweight complete unit. At the on-site location connector 51 is connected to a convenient source of compressed air. While holding cabinet 21 in one hand by means of handle 22 probe 25 is grasped and removed from clips 23 and 24 with the other hand and placed with opening 31 proximal to the surface to be tested and preferably with the front face of the probe held firmly in contact with the fabric and, accordingly opening 31, in direct contact with the fabric.

Thereafter, adjustment to the desired pressure drop is accomplished by utilizing the thumb or a single finger to rotate valve knob 54 to increase or decrease the amount of compressed air introduced to the system. The compressed air passes through inlet tube 50 into vacuum box 47 and continues through outlet tube 48. During passage through vacuum box 47, conventional known flow principles will cause a pressure drop at the top of tube 46 thereby creating a vacuum in the system and drawing air through the surface being tested for permeability into opening 31. The air then passes through chamber 27 into flow meter tube 39. Permeability is measured against a standard static pressure reading and this is measured by the air flow past the probe 32 transferred by and tube 35 to indicate a reading on pressure gauge 36. By adjusting the knob 54, the amount of compressed air can be controlled and consequently the vacuum force applied with the surface being tested and the air being drawn therethrough. When the desired static pressure reading has been obtained as designated by indicator means 37, the air flow through tube 39 will cause displacement of indicator ball 44 to a level at which a reading on either scale 42 or 43 can be obtained for correct reading of the permeability of the surface undergoing testing operations. The air which is drawn through the flow meter 41 and which passes through tube 46 into vacuum box 47 exits from the device with the compressed air received from inlet tube 50 through tube 48 and muffler 49. As stated above, the scale chosen for a direct reading is dependent upon the end cap utilized on probe 25. When the reading has been completed, probe 25 may be replaced in clips 23 and 24 and connector 51 detached from the source of compressed air and the device 20 carried to a new location for a further test.

The above described instrument is capable of making one-sided measurements of the air permeability of fabrics in terms of cfm/sq. ft. at pressure drops across the fabric ranging from 0-5 inches W. G. The flow meter on the instrument as shown has two 5 inch calibrated scales, one scale reading from 5-98 and the other reading from 50 to 750 cfm/sq. ft. These scale arrangements are merely representative of the system of arrangement which may be employed for use of the device in many environments to provide cooperation between the pressure gauge and the flow meter. The device can be constructed to customer specification in regard to flow meter and pressure gauge operation. As shown in FIG. 4, the device 20 is calibrated by standardization against a known laboratory standard such as the Frazier air permeability tester. FIG. 4 indicates the precision of calibration of device 20 in correlation with the standard Frazier unit.

As discussed above, the device is capable of use in many different environments. Air permeability in cfm/sq. ft. is read directly from the scales on the flow meter. In the environment of press section of paper machines, air permeabilities of press felts can be measured either statically or dynamically with greater sensitivity than known field devices. For measurement of wet permeability of press felts it has been found that a pressure drop of two inches W. G. across the fabric is generally acceptable.

Device 20 is capable of indicating lengthwise, that is machine direction, variations of pressed felts also. In this case of dynamic measurement, the pressure drop and air flow can vary considerably depending on machine speed and felt parameters. If desired, damped pressure gauges or snubbing devices can be used to assure average flows. Under static conditions, the flow and pressure drop gauges do not present results of varying permeabilities and the readings are steady.

The device permits for an on-machine measurement of dry fabric air permeability in the cross machine direction in connection with drier sections of paper machines. In regard to wet and dry filtration, the device 20 can be used to monitor, periodically, the permeability of various filtration fabrics.

In the production quality control environment device 20 can measure air permeabilities at various operations in the felt, or any other fabric, manufacturing process such as of base fabric, after needling and after treating to determine how each operation affects final quality. Additionally, final product quality can be checked before packaging. Measurements can be made with considerable ease any place on the fabric not just near the edges.

Naturally, device 20 is usable in the laboratory and can be mounted on the lab bench to be used to evaluate the effect of various treating and cleaning solutions on fabric permeability with greater ease and with less time required than in current measurement techniques. Furthermore, small sized samples obtained from the field, the mill, or lab research and development effort, can be measured quickly and easily on device 20. In general, device 20 can replace the standard Frazier unit.

Many variations of the device as shown and described above are possible and are envisioned. For example, with use of a suitably sized motor and pump combination, the unit can be powered by electricity in place of compressed air. FIG. 5 shows device 20a in condition for use as a pressure testing device by which the compressed air is passed through the probe and then through the material to get direct permeability readings. Similar parts are numbered with the same numbers as in the previously discussed embodiment with the addition of the subscript a. Connector 51a is connected to the source of compressed air which passes through tube 60 at a rate controlled by needle valve 61 into and through flow meter 41a. From flow meter 41a the air is passed through connecting tube 62 into and through probe 25a which has its open end proximal to the material to be tested for direct air permeability reading. Static pressure gauge 36a is connected by means of connector 63 to probe 25a to operate in a similar fashion as the static pressure gauge in the above discussed embodiment. The result is a device 20a which directly reads air permeability while passing air through the material being tested.

Thus, the above objectives, among others, are effectively attained.

I claim:

1. A portable air permeability testing device comprising:
    a hollow remote probe having a passageway therethrough;
    one open end of the probe adapted to be placed proximal to a surface to be tested for permeability and having a predetermined orifice size;
    a flow meter in fluid communication to the other open end of the probe;
    a static pressure probe connected with the interior of the hollow probe;
    a pressure gauge in connection with static pressure probe to measure the static pressure at a predetermined point in the interior of the hollow probe;
    indicator means on the flow meter calibrated with respect to the predetermined orifice size of the one open end of the probe to permit a direct permeability reading; and
    air flow control means to pass air through the surface to be tested, the hollow probe and the flow meter at a predetermined rate to provide a desired static pressure within the hollow probe so that the indicator means on the flow meter calibrated with respect to the predetermined orifice size of the one open end of the probe will directly register the permeability of the surface.

2. The invention in accordance with claim 1 wherein the hollow probe has a removable end cap mounted thereon for interengagement with the surface to be tested, the end cap having a predetermined pattern of openings therethrough to regulate the area of opening for air to flow between the surface being tested and the probe thereby facilitating interchangeability of end caps having different percentages of opening area.

3. The invention in accordance with claim 2 wherein the flow meter contains at least one parallel scale in alignment with the indicator means of the flow meter with each scale adapted to be utilized with a particular removable end cap of predetermined opening area.

4. The invention in accordance with claim 1 wherein a water separation means is mounted between the probe and the flow meter.

5. The invention in accordance with claim 1 wherein a water separation means is mounted between the probe and the pressure gauge.

6. The invention in accordance with claim 1 wherein sealing means are provided at all connection points of the end probe to eliminate leakage of air as it passes through the probe.

7. The invention in accordance with claim 1 wherein a flow meter is connected to an air source so that air passes through the flow meter, through the hollow probe and, thereafter, through the surface to be tested at a predetermined rate to thereby directly register the permeability of the surface, and control means to regulate the air flow from the air source to the flow meter.

8. A portable air permeability testing device comprising:
    a hollow remote probe having a passageway therethrough;
    one open end of the probe adapted to be placed proximal to a surface to be tested for permeability;
    a flow meter in fluid communication to the other open end of the probe;
    a static pressure probe connected with the interior of the hollow probe;
    a pressure gauge in connection with the static pressure probe to measure the static pressure at a predetermined point in the interior of the hollow probe;
    air flow control means to pass air through the surface to be tested, the hollow probe and the flow meter at a predetermined rate to provide a desired static pressure within the hollow probe so that indicator means on the flow meter will directly register the permeability of the surface;
    a source of vacuum connected to the flow meter so that air is drawn through the surface to be tested and thereafter through the hollow probe and the flow meter at a predetermined rate to register the permeability of the surface;
    the source of vacuum including a tube with one end connected to the flow meter, a vacuum box having two opposed lateral openings and a bottom opening therein and a hollow interior;
    the other end of the tube connected to the bottom opening in the box in fluid communication with the interior thereof;
    an air inlet tube connected to one lateral opening of the vacuum box in fluid communication with the interior thereof;
    an outlet tube connected to the other lateral opening of the vacuum box in fluid communication with the interior thereof;
    a source of air under pressure connected to the inlet tube; and
    a valve intermediate the ends of the inlet tube positioned so that regulation of the valve regulates the amount of air forced through the inlet tube through the vacuum box and through the outlet tube and so that forces created by the air passing through the vacuum box reduces the pressure at the bottom opening of the vacuum box where the tube to the flow meter is connected thereby drawing air through the surface to be tested and thereafter through the probe, the flow meter and the vacuum box for exhaustion through the outlet tube at a predetermined rate to directly register the permeability of the surface.

9. The invention in accordance with claim 8 wherein a muffler is mounted on the discharge tube to minimize the noise of air being expelled therefrom.

10. The invention in accordance with claim 8 wherein a cabinet is provided with the flow meter, the pressure gauge, the vacuum box and portions of the inlet and outlet tubes and a substantial portion of the valve are housed in the cabinet with the scales on the flow meter and the pressure gauge being exposed to the exterior of the cabinet, and the cabinet being of lightweight construction to minimize the weight of the testing device.

11. The invention in accordance with claim 10 wherein a variable control knob is on the valve and is rotatable between a position at which no air flow is permitted through the inlet tube and a position at which maximum air flow is permitted through the inlet tube so as to regulate the air flow between a maximum and minimum amount as desired, a portion of the knob extending extending exteriorly of the cabinet for gripping and rotation by the operator.

12. The invention in accordance with claim 11 wherein a handle is mounted on the exterior of the cabinet adjacent to the exposed portion of the valve control knob to facilitate handling and portable use of the device and to permit the device to be held in one hand while simultaneously utilizing the hand to adjust the valve control knob, and clips on the cabinet adapted to removably hold the probe in fixed position on the cabinet when the device is not in use and during transit thereof and to permit removal of the probe from its mounted position on the cabinet for use during actual testing procedures.

* * * * *